United States Patent
Geldbach et al.

(10) Patent No.: US 9,514,754 B2
(45) Date of Patent: *Dec. 6, 2016

(54) COMMAND AND CONTROL OF DEVICES AND APPLICATIONS BY VOICE USING A COMMUNICATION BASE SYSTEM

(71) Applicant: CenturyLink Intellectual Property LLC, Denver, CO (US)

(72) Inventors: Erik Geldbach, Charlotte, NC (US); Kelsyn D. Rooks, Overland Park, KS (US); Shane M. Smith, Bailey, CO (US); Mark Wilmoth, Gardner, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/679,785

(22) Filed: Apr. 6, 2015

(65) Prior Publication Data
US 2015/0221309 A1    Aug. 6, 2015

Related U.S. Application Data

(63) Continuation of application No. 12/011,268, filed on Jan. 25, 2008, now Pat. No. 9,026,447.

(60) Provisional application No. 61/003,519, filed on Nov. 16, 2007.

(51) Int. Cl.
*G10L 21/00*    (2013.01)
*G10L 17/22*    (2013.01)
(Continued)

(52) U.S. Cl.
CPC .............. *G10L 17/22* (2013.01); *G10L 15/08* (2013.01); *G10L 15/22* (2013.01); *H04M 7/1295* (2013.01)

(58) Field of Classification Search
USPC .............. 704/246, 247, 251, 252, 275
See application file for complete search history.

(56) References Cited

U.S. PATENT DOCUMENTS 5,732,394 A    3/1998 Nakadai et al.
5,764,731 A *  6/1998 Yablon .................. H04M 1/271
                                                   379/213.01
(Continued)

OTHER PUBLICATIONS

U.S. Appl. No. 11/985,766; Issue Notification dated Sep. 28, 2011; 1 page.
(Continued)

*Primary Examiner* — Leonard Saint Cyr
(74) *Attorney, Agent, or Firm* — Swanson & Bratschun, L.L.C.

(57) ABSTRACT

A first communication path for receiving a communication is established. The communication includes speech, which is processed. A speech pattern is identified as including a voice-command. A portion of the speech pattern is determined as including the voice-command. That portion of the speech pattern is separated from the speech pattern and compared with a second speech pattern. If the two speech patterns match or resemble each other, the portion of the speech pattern is accepted as the voice-command. An operation corresponding to the voice-command is determined and performed. The operation may perform an operation on a remote device, forward the voice-command to a remote device, or notify a user. The operation may create a second communication path that may allow a headset to join in a communication between another headset and a communication device, several headsets to communicate with each other, or a headset to communicate with several communication devices.

20 Claims, 3 Drawing Sheets

(51) Int. Cl.
　　*G10L 15/22*　　(2006.01)
　　*G10L 15/08*　　(2006.01)
　　*H04M 7/12*　　(2006.01)

(56) References Cited

U.S. PATENT DOCUMENTS

| | | | |
|---|---|---|---|
| 5,844,824 | A | 12/1998 | Newman et al. |
| 6,757,379 | B1 | 6/2004 | Lane |
| 6,871,179 | B1 | 3/2005 | Kist et al. |
| 7,813,762 | B2 | 10/2010 | Sanguino et al. |
| 7,912,020 | B2 | 3/2011 | Khasawneh et al. |
| 8,041,299 | B2 | 10/2011 | Geldbach et al. |
| 9,026,447 | B2 | 5/2015 | Geldbach et al. |
| 2002/0016188 | A1 | 2/2002 | Kashiwamura |
| 2002/0046033 | A1 | 4/2002 | Ono et al. |
| 2002/0057765 | A1* | 5/2002 | Hyziak ............... H04M 11/066 379/52 |
| 2002/0118800 | A1* | 8/2002 | Martinez ........... H04M 3/42161 379/67.1 |
| 2002/0122541 | A1* | 9/2002 | Metcalf ............... H04L 12/2856 379/88.02 |
| 2003/0147518 | A1* | 8/2003 | Albal ..................... H04M 1/57 379/207.15 |
| 2003/0185375 | A1* | 10/2003 | Albal ..................... H04M 3/58 379/220.01 |
| 2005/0188316 | A1 | 8/2005 | Ghanamgari et al. |
| 2005/0282592 | A1 | 12/2005 | Frerking et al. |
| 2007/0041582 | A1 | 2/2007 | Lam |
| 2007/0233485 | A1 | 10/2007 | Hitotsumatsu et al. |
| 2007/0288242 | A1 | 12/2007 | Spengler et al. |
| 2008/0126092 | A1 | 5/2008 | Kawazoe et al. |
| 2008/0261524 | A1 | 10/2008 | Grushkevich |
| 2008/0275007 | A1 | 11/2008 | Sparks |
| 2008/0311988 | A1 | 12/2008 | Smith et al. |
| 2009/0129569 | A1 | 5/2009 | Geldbach et al. |

OTHER PUBLICATIONS

U.S. Appl. No. 11/985,766; Non-Final Office Action dated Dec. 22, 2010; 18 pages.
U.S. Appl. No. 11/985,766; Notice of Allowance dated Jun. 17, 2011; 18 pages.
U.S. Appl. No. 12/011,268; Final Rejection dated Nov. 29, 2012; 18 pages.
U.S. Appl. No. 12/011,268; Final Rejection dated Dec. 11, 2013; 19 pages.
U.S. Appl. No. 12/011,268; Final Rejection dated Feb. 8, 2012; 15 pages.
U.S. Appl. No. 12/011,268; Final Rejection dated Apr. 16, 2012; 15 pages.
U.S. Appl. No. 12/011,268; Final Rejection dated Jul. 5, 2012; 16 pages.
U.S. Appl. No. 12/011,268; Final Rejection dated Sep. 5, 2014; 16 pages.
U.S. Appl. No. 12/011,268; Issue Notification dated Apr. 15, 2015; 1 page.
U.S. Appl. No. 12/011,268; Non-Final Rejection dated Apr. 10, 2014; 16 pages.
U.S. Appl. No. 12/011,268; Non-Final Rejection dated Apr. 16, 2012; 16 pages.
U.S. Appl. No. 12/011,268; Non-Final Rejection dated Jul. 18, 2013; 18 pages.
U.S. Appl. No. 12/011,268; Non-Final Rejection dated Aug. 30, 2012; 18 pages.
U.S. Appl. No. 12/011,268; Non-Final Rejection dated Sep. 22, 2011; 16 pages.
U.S. Appl. No. 12/011,268; Notice of Allowance dated Jan. 5, 2015; 17 pages.

* cited by examiner

COMMAND AND CONTROL OF DEVICES AND APPLICATIONS BY VOICE USING A COMMUNICATION BASE SYSTEM

CROSS-REFERENCE TO RELATED APPLICATIONS

This application is a continuation of U.S. application Ser. No. 12/011,268 filed Jan. 25, 2008 by Geldbach et al. and titled, "Command and Control of Devices and Applications by Voice Using a Communication Base System", which claims priority from the following U.S. Provisional Patent Application No. 61/003,519 filed on Nov. 16, 2007 by Geldbach et al. and titled, "Command and Control of Devices and Applications by Voice Using a Communication Base System", both of which are hereby incorporated by reference in its entirety.

BACKGROUND

Field of the Invention

The principles of the present invention relate generally to an improved communication system, and in particular, to an improved system and method for interaction with several systems and telecommunication devices. Still more particularly, the principles of the present invention relate to a communication base system and method for command and control of devices and applications by voice using the communication base system.

Description of the Related Art

A communication device is a device that may place or receive a telecommunication. The term "communication devices" refers to the collection of all devices usable for telecommunication. For example, a communication device can be the familiar telephone, a computer with a telecommunication enabling software application, which are commonly known as softphones, a telephone-like device that works over data networks instead of a plain old telephone system (POTS) line, a wireless or cellular phone, or any other device used for telecommunication. A communication device is any one of these communication devices. Communication devices may also include devices and applications capable of communicating in other ways, for example, by text messaging, instant messaging including text, audio, video, images, and documents. Communication devices may further include radio transceivers embedded in appliances, computers, as well as automobiles.

Presently, wearable devices are available that a user can use for interacting with a variety of systems and devices. Some examples of such wearable devices are wired and wireless headsets that include at least a speaker and a microphone. A user may connect these headsets to a device using wires or a wireless protocol, such as Bluetooth, in order to interact with that device. The user can wear the headset and engage in voice telecommunication when the headset is connected with a communication device. The user may also couple the headset with a computer and engage in a voice over Internet Protocol (VOIP) telecommunication using a softphone software application.

As some more examples, a user may use a headset to interact with a gaming console, such as Xbox® manufactured by Microsoft® Corporation, or PlayStation® manufactured by Sony® Corporation. A user may use a headset for dictating a document to speech-to-text software. Wearable headsets integrating a microphone and a speaker are presently used for a variety of activities with a variety of devices.

However, headsets and other devices for similar purposes are presently able to interact with one system or device at a time. The interaction with one device may be over a wired or wireless connection. In one example, when using a Bluetooth headset with a first device, such as a landline phone, the user has to disassociate (e.g., disconnect) the headset from a second device, such as a mobile phone, and associate the headset with the first device. Of course, the headset would need to be pre-registered with each device before associating the headset with either device.

SUMMARY

In order to enable several devices, such as headsets, to communicate with several communication devices over a range of types of networks simultaneously, the illustrative embodiments provide a method, computer usable program product, and system for command and control of devices and applications by voice using a communication base system. A first communication path for receiving a communication is established. The communication includes speech. The speech is processed. A speech pattern is identified as including a voice-command. A portion of the speech pattern is determined as including the voice-command. That portion of the speech pattern is separated from the speech pattern and compared with a second speech pattern. If the two speech patterns match or resemble each other, the portion of the speech pattern is accepted as the voice-command. An operation corresponding to the voice-command is determined and performed.

The voice-command may be received during the communication as a part of the speech. Performing the operation may be performing the operation on a remote device or establishing a second communication path between a first device that sends the voice-command and second device.

The second communication path may allow a headset to join in a communication between another headset and a communication device, a plurality of headsets to communicate with each other, a headset to communicate with a plurality of communication devices, or any combination thereof. The operation may also forward the voice-command to a remote device or notify a user.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

A communication base system, or simply a "base system", as described in the co-pending U.S. application Ser. No. 11/985,766, entitled Communication Base System and Method of Using the Same, filed on Nov. 16, 2007 and which is incorporated herein in its entirety by reference, may be used for voice-commands using the headsets. A voice-command, or a verbal command, is a command or instruction given to a system using voice or speech.

Illustrative embodiments recognize that a user would like to be able to use a single headset for communicating with more than one device without having to engage in a process of disassociating the headset from a previous device, and associating the headset with a new device. The illustrative embodiments further recognize that several users, each with a variation of a headset, may wish to communicate with a common communication device. A user with a headset may wish to engage in communication with one or more other users with headsets, one or more communication devices, or any combination thereof, using a communication base system. The user may wish to engage in such communication by having the communication base system perform the desired functions through voice-commands.

Therefore, a system that is capable of processing voice-commands for allowing one or more headsets to communicate with one or more other headsets and communication devices without the user having to perform an association and disassociation of the headset with each device may be useful. Such a system may be further useful by processing voice-commands for performing other actions on applications running locally on the system or remotely on communication devices. The illustrative embodiments describe such a system and methods of using that system.

Wired or wireless headsets are just some examples of wearable devices that users use for communication purposes. Many devices facilitate a user's communication with a computer or another device in a manner similar to that of a headset. For example, a desk-microphone and a desk-speaker may facilitate a user's communication with a computer in a manner similar to the wearable headset. For the clarity of the description below, the illustrative embodiments are described with respect to a headset. However, the headsets are not limiting on the illustrative embodiments, and a particular implementation may use any other device that may communicate with communication devices, such as a headset, may communicate with those communication devices.

Figure 1:
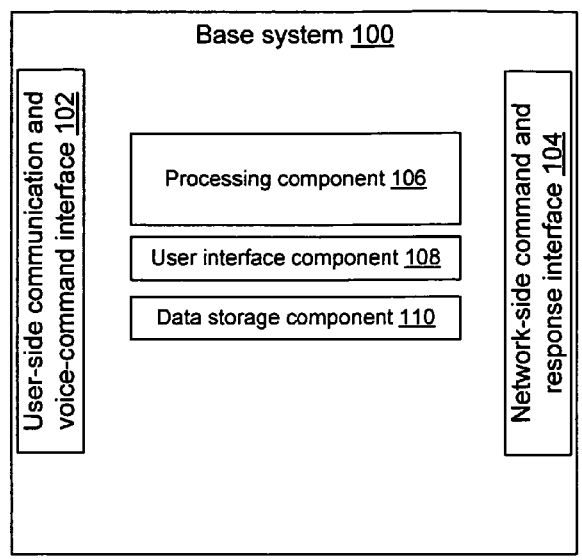
FIG. 1 depicts a block diagram of components of a base system in accordance with an illustrative embodiment.

With reference to FIG. 1, this figure depicts a block diagram of components of a base system in accordance with an illustrative embodiment. Base system 100 may include user-side communication and voice-command interface 102 (interface 102). Interface 102 may be a software component, a hardware component, or a combination thereof. Interface 102 may enable communication between base system 100 and one or more headsets that a user may use for voice communications as well as issuing voice-commands.

Base system 100 may further include network-side command and response interface 104 (interface 104). Interface 104 may also be a software component, a hardware component, or a combination thereof. Interface 104 may enable communication between base system 100 and one or more communication devices. A user interfacing with base system 100 using interface 102 may be able to send voice-commands to a communication device interfacing with base system 100 via interface 104. Furthermore, base system 100 may communicate a command, whether in the form of a voice-command, a software invocation, a hardware interrupt, or any other suitable form, to communication devices using interface 104.

Base system 100 may further include processing component 106. Processing component 106 may be a digital signal processing (DSP) component, or any other type of processing component that is capable of processing voice-commands. User interface component 108 may allow a user to program, configure, access, or otherwise manipulate base system 100. Data storage component 110 may store information used in communications between headsets and communication devices that base system 100 may establish. For example, data storage component 110 may store information pertaining to configuration and operation of base system 100, interface parameters of various headsets and communication devices, instructions for processing a set of voice-commands, and any other information that may be used in a particular implementation of base system 100.

Figure 2:
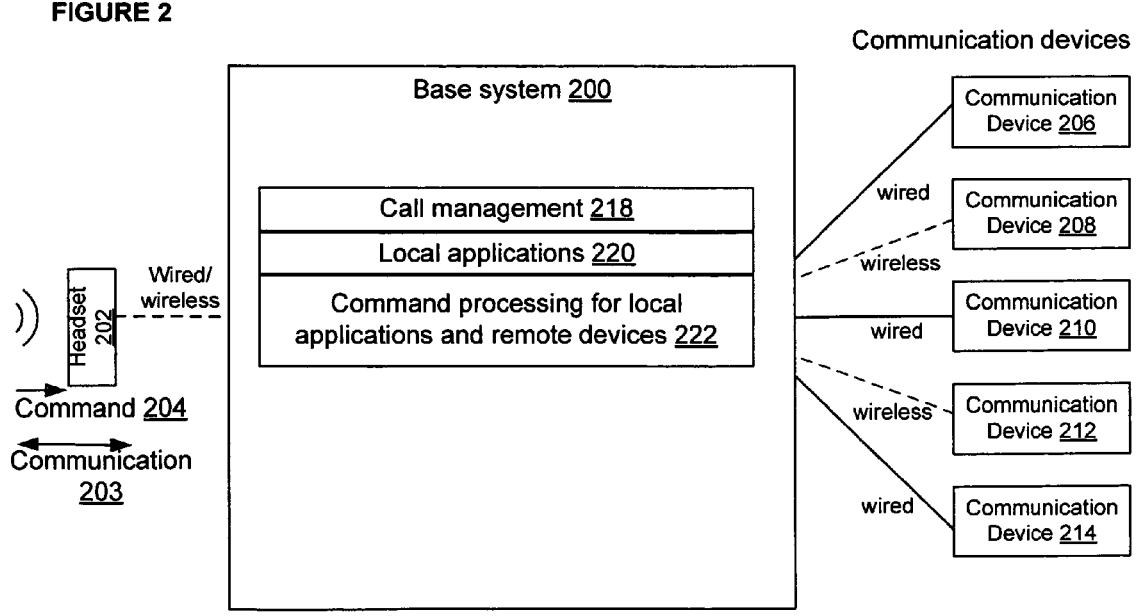
FIG. 2 depicts a block diagram of application components of a base system in accordance with an illustrative embodiment.

With reference to FIG. 2, this figure depicts a block diagram of application components of a base system in accordance with an illustrative embodiment. Base system 200 may be similar to base system 100 in FIG. 1. Base system 200 may communicate with headset 202 as well as any number of other headsets. Headset 202 may engage in voice communication 203 using base system 200, or issue voice-command 204, which may be directed to base system 200 or a communication device, such as any of communication devices 206, 208, 210, 212, and 214.

Call management component 218 may facilitate voice communication between a headset and a communication device, such as between headset 204 and communication device 206 via base system 200. Local applications 220 may be one or more applications executing on base system 200. For example, a recording application executing on base system 200 may be a local application in local applications 220. Some other examples of local applications 220 may be logging, screening, displaying, reporting, notifying, configuring, updating, and managing applications.

Command processing 222 may be a processing engine for processing voice-commands, such as voice-command 204. Command processing 222 executing on base system 200 may be able to understand voice-commands. A user, using headset 202 or another device capable of receiving the user's voice, may speak a voice-command, such as voice-command 204, that base system 200 may be able to recognize by processing the voice-command using command processing 220. The user may speak only the voice-command, speak the voice-command with ambient sounds, or speak the voice-command during a conversation with another party when the conversation is occurring through the base system. The base system may receive the voice-command as a speech pattern and apply processing, such as digital signal processing, to the speech to recognize that the speech includes a voice-command.

The base system may be trained to recognize a set of voice-commands from a set of users in those users' voices. A set of voice-commands is one or more voice-commands. A set of users is one or more users. For example, one or more users may submit their speech patterns for the same or different voice-commands. The users may correlate those voice-commands at the base system with specific operations they want the base system to execute when they speak one of those voice-commands. For example, a user may train the base system to recognize the address word "Base" followed by a command, such as "connect with cell phone." Another user may train the base system to recognize just the command "connect to my cell phone". Both users may then correlate their respective commands to the operation of connecting their respective headsets with their respective cell phones. Many other commands and formats of commands are conceivable based on the principles described in this disclosure. For example, a user may configure a phrase in a language other than English, a pneumonic, or a noun as a voice-command for a specific operation.

In an alternative embodiment, rather than or in addition to the voice-commands, a dual-tone multi-frequency (DTMF) recognition engine may operate to recognize and respond to DTMF signals to perform certain functions. For example, pressing the number "1" key on a headset or another device that may include a keypad may send a DTMF signal to the base system to perform a function. Similarly, pressing the number "2" key may send a DTMF signal to the base system for performing a different function. For example, pressing "1" may cause the base unit to connect a call; pressing "2" may cause the base unit to disconnect a call.

Figure 3:
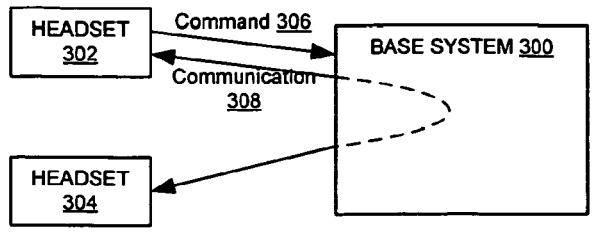
FIG. 3 depicts a block diagram of a first type of command processing in a base system in accordance with an illustrative embodiment.

With reference to FIG. 3, this figure depicts a block diagram of a first type of command processing in a base system in accordance with an illustrative embodiment. Base system 300 may be similar to base system 200 in FIG. 2. Headset 302 and 304 may each be a headset similar to headset 202 in FIG. 2, or a comparable device capable of sending and receiving voice communications.

A user of headset 302 may be able to interact verbally with a user of headset 304 via base system 300. For example, headset 302 may accept voice-command 306 from the first user that may instruct base system 300 to establish communication path 308 between headset 302 and headset 304. Note that headset 302, headset 304, or both headsets may be engaged in communications with other communication devices at the time of voice-command 306. For example, the first user may be using the headset 302 for a telephone conversation with a party. The second user using headset 304 may be engaged in a voice interactive game on a gaming console. The first user may issue voice-command 306 during the telephone conversation, such as "base . . . connect with John". The base system may establish communication between the first user and "John," the second user, such that neither the party that the first user is conversing with, nor the gaming console that John may be interacting with, receives any signals corresponding to the conversation between the first user and John that follows voice-command 306. That conversation may occur on communication path 308 established as a result of voice-command 306. The first user may speak another voice-command to terminate the sidebar conversation with John and resume normal conversation with the party.

Figure 4:
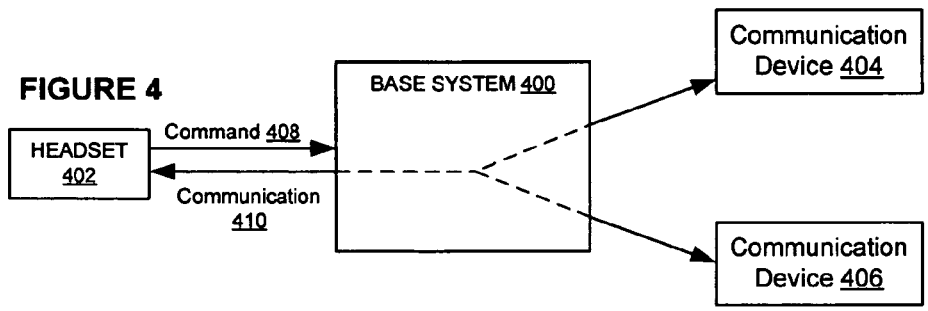
FIG. 4 depicts a block diagram of a second type of command processing in a base system in accordance with an illustrative embodiment.

With reference to FIG. 4, this figure depicts a block diagram of a second type of command processing in a base system in accordance with an illustrative embodiment. Base system 400 may be similar to base system 300 in FIG. 3. Headset 402 may be a headset similar to headset 202 in FIG. 2, or a comparable device capable of sending and receiving voice communications. Communication device 404 and 406 may each be a communication device similar to any of communication devices 206-214 in FIG. 2.

A user of headset 402 may be able to issue voice-commands to the communication base system. For example, a user may be able to instruct base system 400 using voice-command 408 to connect the user's headset with communication device 404, which may be the user's cell phone, as well as communication device 406, which may be the user's desk phone. Base system 400 may then establish communication path 410 so the user may be able to switch between the two conversations on those two communication devices. As another example of using the illustrative embodiment in this figure, the user may instruct base system 400 using voice-command 408 to connect headset 402 to the user's mobile phone as well as the user's computer. Base system 400 may then establish communication path 410 so that the user may interact with a VOIP application on the computer as well as have a voice conversation on the user's mobile phone. As another example, the user may be able to use voice-command 408 to cause base system 400 to perform certain base system operations, such as by using local applications 220 in FIG. 2. Examples of base system operations may be increasing the volume of a call, placing a call on hold, squelching the noise on a call, or any other function a particular base system may be able to support.

Figure 5:
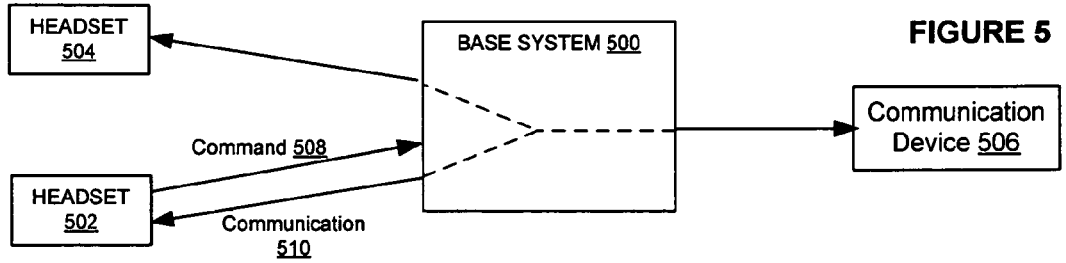
FIG. 5 depicts a block diagram of a third type of command processing in a base system in accordance with an illustrative embodiment.

With reference to FIG. 5, this figure depicts a block diagram of a third type of command processing in a base system in accordance with an illustrative embodiment. Base system 500 may be similar to base system 400 in FIG. 4. Headset 502 and 504 may each be a headset similar to headset 202 in FIG. 2, or a comparable device capable of sending and receiving voice communications. Communication device 506 may be a communication device similar to any of communication devices 206-214 in FIG. 2.

A user of headset 502 may be able to issue voice-commands to base system 500. For example, a user may be able to instruct base system 500 using voice-command 508 to connect headset 502 into a conversation that headset 504 may be having using communication device 506, which may be the user's cell phone. Base system 500 may then establish communication path 510 so the users of headset 502 and 504 may both be able to jointly communicate with communication device 506.

A user of headset 502 may also be able to issue voice-command 508 to communication device 506 accessible through base system 500. For example, a user may be able to instruct base system 500 using voice-command 508 to pass-through the subsequent voice commands. An example of such a voice-command process may include a user speaking, "Base . . . pass to mobile phone," followed by "phonebook." Base system 500 would then pass the speech pattern of the user saying "phonebook" to communication device 506, the user's mobile phone, which may also be trained to recognize some voice-commands. Upon receiving the "phonebook" voice-command, the mobile phone may display the list of contacts stored on the mobile phone to the user. As another example, the user may speak, "Base . . . pass to computer," followed by "launch Word," prompting the user's computer to launch the Microsoft™ Word® application.

A user of a headset may also be able to issue voice-commands to the base system and have the base system invoke a corresponding operation on the base system, one or more communication devices, or any combination thereof. For example, in the above example of launching the Microsoft™ Word® application on a computer, the user may speak "launch Word" voice-command. The base system may launch the application on the computer using an application programming interface (API) or other interoperability methodology. As another example, a voice-command from a headset to a base system may result in a web-service, an API, or a remote procedure call (RPC) being invoked on a communication device or a network by the base system.

Figure 6:
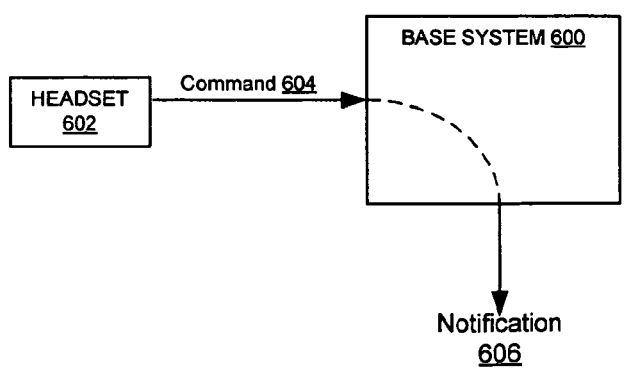
FIG. 6 depicts a block diagram of a fourth type of command processing in a base system in accordance with an illustrative embodiment.

With reference to FIG. 6, this figure depicts a block diagram of a fourth type of command processing in a base system in accordance with an illustrative embodiment. Base system 600 may be similar to base system 500 in FIG. 5. Headset 602 may be a headset similar to headset 202 in FIG. 2, or a comparable device capable of sending and receiving voice communications.

A user of headset 602 may be able to trigger an operation on base system 600 using voice-command 604. For example, a user may be able to speak a voice-command "notify John 1234" to cause base system 600 to send a notification, such as an email, page, phone, fax, or any other kind of notification, to a user John with the code "1234". Of course, particular implementations may use an actual notification message instead of a code, or use other words, text, or codes instead of the exemplary code used here without departing from the scope of the illustrative embodiments.

A user of a headset may also be able to configure the base system using voice-commands. For example, the user may be able to speak voice commands, such as "call linking" to enable a feature in the base system that may allow a second headset to link into a call in progress using a first headset. FIG. 5 and the corresponding description above describe the call linking operation. As another example, a user using a first headset may be engaged in a game on a gaming console via the base system. A second user may similarly link into the same game by speaking voice-commands in a similar manner.

Figure 7:
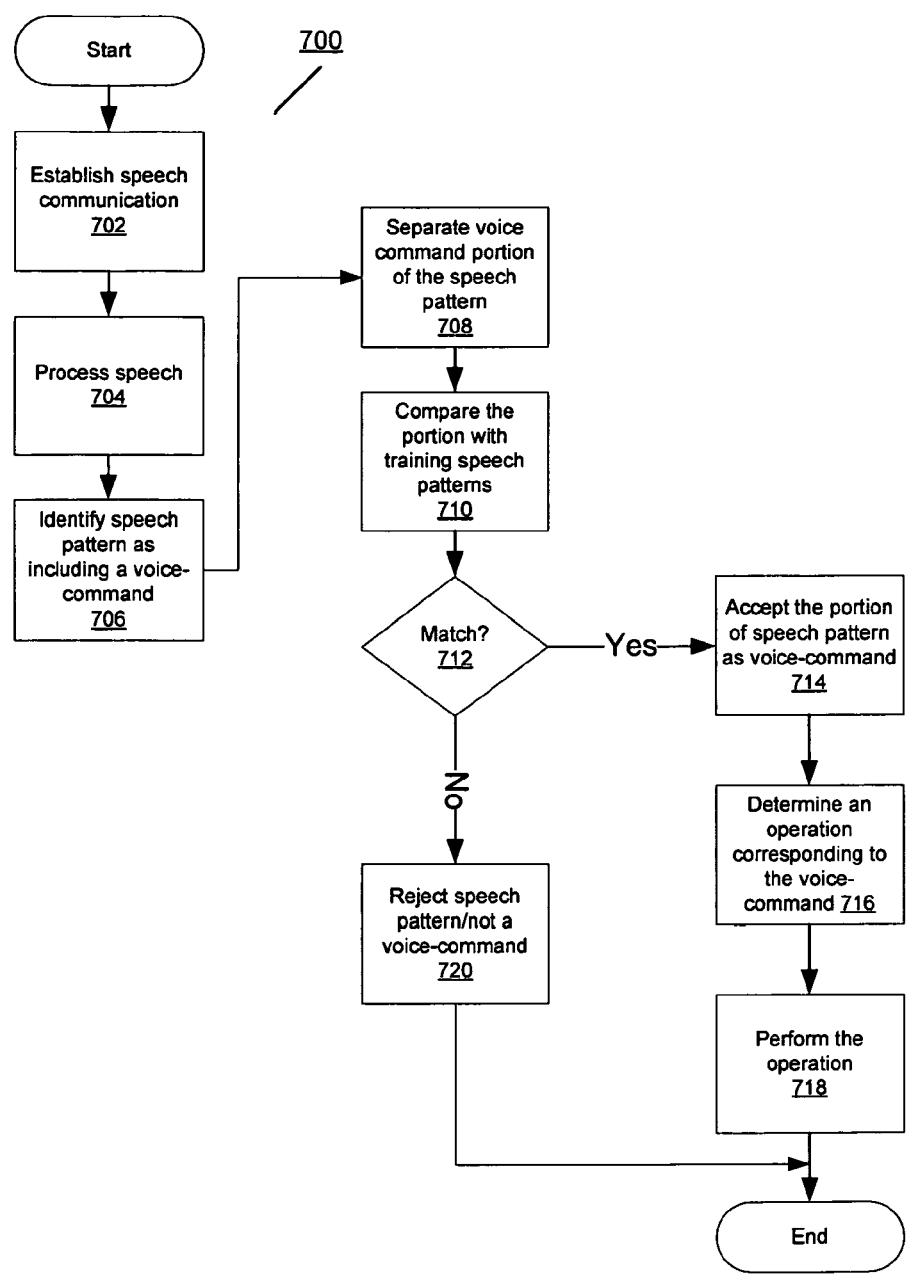
FIG. 7 depicts a flowchart of a process of processing voice-commands in accordance with an illustrative embodiment.

With reference to FIG. 7, this figure depicts a flowchart of a process of processing voice-commands in accordance with an illustrative embodiment. Process 700 may be implemented in base system 200 in FIG. 2.

Process 700 begins by establishing a communication path for voice communication, to carry speech as well as voice-commands (step 702). The communication path may be a wired or wireless connection. Speech is the sound of voice conversations. Speech pattern is a segment of the speech that has specific characteristics, such as those associated with the sound when specific words are spoken. The process processes the speech (step 704). Speech processing may be accomplished using many technologies, including digital signal processing. Processing engine, such as in command processing component 222 in FIG. 2, may employ such technologies to process speech.

The process identifies a speech pattern as including a voice-command (step 706). The process may identify the speech pattern in any suitable way, including, by identifying address words, such as "Base . . . " as explained in the examples above. The process then separates a portion of the speech pattern as being the voice-command (step 708). For example, "connect to mobile phone" portion of the speech pattern "Base . . . connect to mobile phone" may be the voice-command portion.

The process then compares the separated portion of the speech pattern with training speech patterns (step 710). For example, a user may train the base system with several variations of his or her speech patterns for certain commands. Such training speech patterns may be used by the process for the comparison in step 710. Of course, other sources of training speech patterns, such as standard speech pattern databases may also be used.

The process then determines if the separated portion of the speech pattern matches or closely resembles any of the training speech patterns (step 712). A resemblance is close if the separated speech pattern and the training speech patterns resemble each other within a preset threshold. If the process determines that the separated portion of the speech pattern matches or closely resembles a training speech pattern ("Yes" path of step 712), the process accepts the separated portion of speech pattern as a voice-command (step 714). The process then determines an operation that corresponds with that voice-command (step 716). For example, a database may store a list of operations correlated with specific voice-commands. The process performs the operation that corresponds with the voice-command (step 718). The process ends thereafter.

If, however, the process determines that the separated portion of the speech pattern does not match or closely resemble any training speech patterns, the process rejects the speech pattern, or determines that the speech pattern is not a voice-command (step 720). The process ends thereafter. In an implementation of the process, the process may return to step 702 after steps 718 and 720.

The components and the operations described above are exemplary and not intended to be limited to the illustrative embodiments. The depiction and description have been selected to explain the operation of the base system in accordance with the illustrative embodiments. Many other components and operations thereof will be conceivable in particular implementations of the illustrative embodiments.

Furthermore, the voice-commands described in the illustrative embodiments above are only exemplary. Many other voice-commands may be conceived to similar features, functions, and operations. Furthermore, the above illustrative embodiments utilize headsets only for clarity. Any other device capable of voice communication, whether wired or wireless, may be used without departing from the scope of the illustrative embodiments. The communication devices described in the above illustrative embodiments are also exemplary. Any equipment, component, machinery, system, or apparatus usable with a headset or similar device may be operated in the manner described above.

Thus, the illustrative embodiments provide a communication base system and methods of using that base system for enabling communication and interactions between one or more headsets and several communication devices. The illustrative embodiments enable these communication and interactions without associating or disassociating a headset with each communication device. The illustrative embodiments allow several headsets and several communication devices to communicate with each other simultaneously without the limitation of one-headset-to-one-communication-device association as is presently required.

The illustrative embodiments further allow users to perform operations on the base system and communication devices using voice-commands. Users can configure the headsets and the base system so that the user may speak commands corresponding to operations they would like performed. The illustrative embodiments provide exemplary voice-commands and operations for sidebar conversation between headsets, linking multiple headsets to a common call, and connecting several calls to a headset for switching. The illustrative embodiments may be implemented according to the above description for providing voice-command interface to communication devices and applications on communication devices that may otherwise not be voice-command enabled.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed is:

1. A method for controlling devices and applications using voice-commands and DTMF signals, the method comprising:
    establishing a first communication path between a first communication device and a base station;
    establishing a second communication path between the first communication device and a second communication device via the base station;
    relaying a verbal communication between the first communication device and the second communication device via the base station, wherein the verbal communication comprises a first portion of the verbal communication comprising conversation between a user of the first communication device and a user of the second communication device and a second portion of the verbal communication comprising a voice command;
    contemporaneously processing the first portion of the verbal communication comprising conversation and the second portion of the verbal communication comprising the voice command with a processing engine of the base station;
    identifying, with the processing engine, within the contemporaneously processed first and second portions of the verbal communication, during the verbal communication between the first user and the second user, the second portion of the verbal communication as comprising a voice command;
    determining, by the base station, a first operation corresponding to the identified voice-command;
    performing, by the base station, the first operation corresponding to the identified voice-command;
    identifying, by the base station, a DTMF signal input from the first communication device during the communications between the first communication device and the second communication device;
    determining, by the base station, a second operation corresponding to the DTMF signal; and
    performing, by the base station, the second operation corresponding to the DTMF signal.

2. The method of claim 1, wherein the voice command includes a verbal description of the first operation.

3. The method of claim 1, wherein the voice command includes a code identifying the first operation.

4. The method of claim 1, wherein the first operation for the voice command of the user differs from an operation for the voice command of a second user.

5. The method of claim 1, wherein performing the first or second operation establishes a second communication path between the user that sent the voice-command and a third communication device.

6. The method of claim 1, wherein the first or second operation is forwarding the verbal communication to one or more communications devices.

7. The method of claim 1, wherein the first or second operation is sending a notification to another user.

8. A base station storing computer executable instructions on a non-transitory storage medium, said instructions for controlling devices and applications using voice-commands that, when said instructions are executed, cause the base station to:
    establish a first communication path directly between a first communication device and a base station;
    establish a second communication path between the first communication device and a second communication device via the base station;
    relay a verbal communication between the first communication device and the second communication device via the base station, wherein the verbal communication comprises a first portion of the verbal communication comprising conversation between a user of the first communication device and a user of the second communication device and a second portion of the verbal communication comprising a voice command;
    contemporaneously process the first portion of the verbal communication comprising conversation and the second portion of the verbal communication comprising the voice command with a processing engine of the base station;
    identify, with the processing engine, within the contemporaneously processed first and second portions of the verbal communication, during the verbal communications between the first user and the second user, the second portion of the verbal communication as comprising a voice command;
    determine a first operation corresponding to the identified voice-command;
    perform the first operation corresponding to the identified voice-command;
    identify a DTMF signal input from the first communication device during the communications between the first communication device and the second communication device;
    determine a second operation corresponding to the DTMF signal; and
    perform the second operation corresponding to the DTMF signal.

9. The base station of claim 8, wherein the voice command includes a verbal description of the first operation.

10. The base station of claim 8, wherein the voice command includes a code identifying the first operation.

11. The base station of claim 8, wherein instructions causing the base station to perform the operation include communicating instructions to perform the operation on a remote device.

12. The base station of claim 8, wherein the first or second operation forwards the voice-command to a remote device.

13. The base station of claim 8, wherein the first or second operation is sending a notification to another user.

14. A base station for controlling devices and applications using voice-commands and DTMF signals, the base station comprising:
- a user-side interface coupled to a first communication path and configured receive verbal communications and DTMF signals from a user, said verbal communications comprising in part a voice-command from the user; and
- a processing engine in communication with the user-side interface through the first communication path, said processing engine being configured to;
  - establish a first communication path directly between a first communication device and the base station;
  - establish a second communication path between the first communication device and a second communication device coupled to a network side interface via the base station;
  - relay a verbal communication between the first communication device and the second communication device via the base station, wherein the verbal communication comprises a first portion of the verbal communication comprising conversation between a user of the first communication device and a user of the second communication device and a second portion of the verbal communication comprising a voice command;
  - contemporaneously process the first portion of the verbal communication comprising conversation and the second portion of the verbal communication comprising the voice command with a processing engine of the base station;
  - identify, with the processing engine, within the contemporaneously processed first and second portions of the verbal communication, during the verbal communications between the first user and the second user the second portion of the verbal communication as comprising a voice command;
  - determine a first operation corresponding to the identified voice-command;
  - perform the first operation corresponding to the identified voice-command;
  - identify a DTMF signal input from the first communication device during the communications between the first communication device and the second communication device;
  - determine a second operation corresponding to the DTMF signal; and
  - perform the second operation corresponding to the DTMF signal.

15. The base station of claim 14, wherein the voice command includes a verbal description of the first operation.

16. The base station of claim 14, wherein the voice command includes a code identifying the first operation.

17. The base station of claim 14, wherein performance of the first or second operation include performance of the first or second on a remote device.

18. The base station of claim 14, wherein the first or second operation forwards the voice-command to a remote device.

19. The base station of claim 14, wherein the user-side interface receives the voice-command during the communication.

20. The base station of claim 14, wherein the second communication path enables a plurality of headsets to communicate with each other.

* * * * *